United States Patent [19]
Muraoka et al.

[11] Patent Number: 5,839,111
[45] Date of Patent: Nov. 17, 1998

[54] CONTROLLER AND CONTROL METHOD

[75] Inventors: Jochiku Muraoka; Nobuo Kato, both of Kanagawa, Japan

[73] Assignee: Sony Corporation, Tokyo, Japan

[21] Appl. No.: 771,682

[22] Filed: Dec. 23, 1996

[30] Foreign Application Priority Data

Dec. 28, 1995 [JP] Japan ................................ 7-342420

[51] Int. Cl.⁶ ................................................ G10L 3/00
[52] U.S. Cl. ............................................ 704/275; 704/270
[58] Field of Search ............................. 704/275, 270

[56] References Cited

U.S. PATENT DOCUMENTS

5,594,789  1/1997  Seazholtz ........................ 704/275

*Primary Examiner*—David R. Hudspeth
*Assistant Examiner*—Robert Louis Sax
*Attorney, Agent, or Firm*—Frommer Lawrence & Haug LLP; William S. Frommer

[57] ABSTRACT

An audio/video (AV) information transaction system includes AV appliances installed in individual rooms, controllers associated with the AV appliances and a host computer which is linked with the controllers through a local area network (LAN), thereby forming a computer network. The host computer transfers control programs to the controllers. A controller in a room which runs the received control program sends a command signal of the demand of AV output reception to other controller in other room over the LAN cable, and the receiving controller operates the associated AV appliance and delivers the output AV signal to the demanding controller over the LAN cable.

15 Claims, 6 Drawing Sheets

CONTROLLER AND CONTROL METHOD

BACKGROUND OF THE INVENTION

1. Field of the Invention

The present invention relates to a controller and control method, and particularly to a controller and control method in which a plurality of controllers are organized to form a computer network, with arbitrary controllers being capable of controlling appliances connected to themselves and appliances connected to other controllers.

2. Description of Related Art

In recent years, it has become possible for firms and other organizations to construct computer networks by linking personal computers and OA appliances and transact mutually various data created by the equipment so as to utilize information effectively.

A computer network in which multiple computers are linked is used to realize distributed processing in which a process is carried out by multiple machines or realize a distributed database system in which multiple machines form individual databases.

In such a computer network, it is possible for one computer to control appliances connected to other computers within the computer network. For example, by operating individual computers to run control programs for appliances in the network and transact control information with other computers, it is possible for arbitrary computers to control arbitrary appliances.

Specifically, by installing controllers (computers) provided with control programs in their internal memories and connected with various audio/video (AV) appliances in individual rooms, with the controllers being linked to form a computer network and the AV appliances being connected through a CATV (cable television) cable, it is possible for the user in one room to operate the controller to send control information to a controller in other room so as to watch and hear the output of an AV appliance of the other room.

However, this computer network configuration requires the controller of each room to include a computer with suitable CPU ability and a hard disk for storing the control program, resulting in a costly system.

Another problem of this computer network is that control programs of all controllers must be modified each time the configuration of AV appliances is changed or the number of rooms is altered, disallowing easy system maintenance.

As another scheme of constructing a system for the above-mentioned purpose in place of the computer network, a controller is installed in a control room and simple terminal units are installed in individual rooms, with the controller and terminal units being connected through a SCSI (Small Computer System Interface) cable or GP-IB (General-Purpose Interface Bus). However, these cables are limited in length for transmitting information, and therefore it is difficult to realize a practical system.

SUMMARY OF THE INVENTION

In view of the foregoing situation, the present invention is intended to construct a computer network formed of a host computer with control programs stored in it and simple terminal units, thereby realizing an inexpensive and easy-maintenance bi-directional control system.

The invention set forth in claim 1 resides in a controller which comprises means of receiving a control program that is transferred through the computer network, and means of controlling an AV appliance in accordance with the received control program so that the AV appliance sends an AV signal to the AV network or receives an AV signal from the AV network.

The invention set forth in claim 3 resides in a control method which comprises the steps of receiving a control program that is transferred through the computer network, and controlling an AV appliance in accordance with the received control program so that the AV appliance sends an AV signal to the AV network or receives an AV signal from the AV network.

In the controller set forth in claim 1, the receiving means receives a control program that is transferred through the computer network, and the control means controls an AV appliance in accordance with the received control program so that the AV appliance sends an AV signal to the AV network or receives an AV signal from the AV network.

In the control method set forth in claim 3, a control program transferred through the computer network is received, and an AV appliance is controlled in accordance with the received control program so that the AV appliance sends an AV signal to the AV network or receives an AV signal from the AV network.

DESCRIPTION OF THE PREFERRED EMBODIMENT

An embodiment of this invention will be described with reference to the drawings. Initially, the correspondence between items appearing in the embodiment as examples and means described in the scope of claim for a patent.

The controller set forth in claim 1 is linked to a computer network and adapted to control AV appliances that are connected mutually through an AV network for transmitting AV signals, and it comprises reception means (e.g., Ethernet interface 34 shown in FIG. 3) for receiving a control program that is transferred through the computer network, and control means (e.g., CPU 31 of FIG. 3 for implementing the process shown in FIG. 6) for controlling an AV appliance in accordance with the control program received by the reception means so that the AV appliance sends an AV signal to the AV network or receives an AV signal from the AV network.

Figure 1:
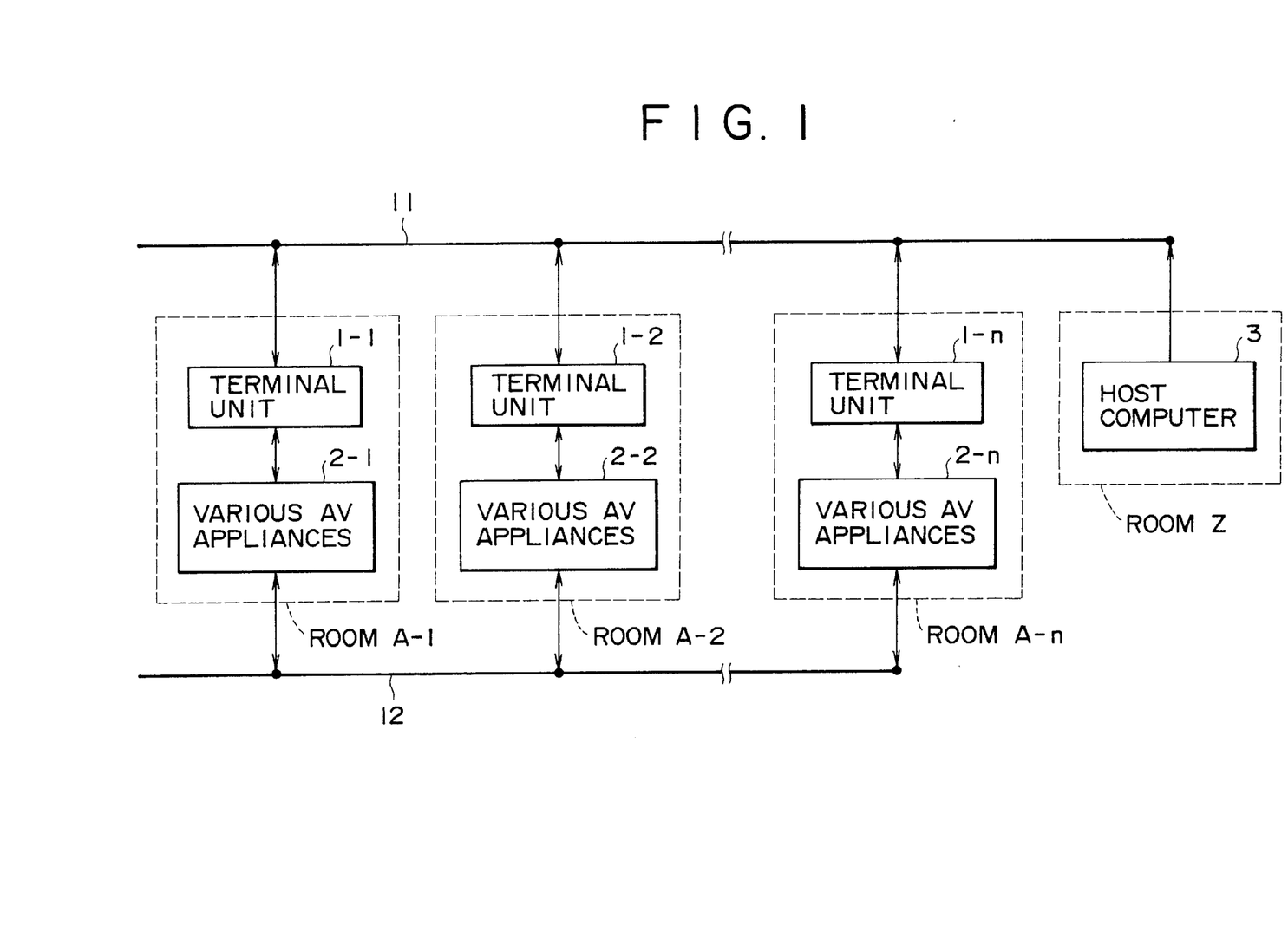
FIG. 1 is a block diagram showing the configuration of a bi-directional control system in which inventive controllers are used.

FIG. 1 shows a bi-directional control system in which the inventive controllers are used. The system includes terminal units 1-1 through 1-n, various AV (audio/video) appliances 2-1 and 2-n that are controlled by the respective terminal units, and a host computer 3. The pairs of terminal units and AV appliances are installed in n rooms A-1 through A-n, respectively, and the host computer is installed in a room Z.

The host computer 3 and terminal units 1-1 through 1-n in a 10BASE-2 standard bus-type network structure are linked through a LAN (Local Area Network) cable 11 to form a LAN of the Ethernet type. Alternatively, the host computer 3 and terminal units 1-1 through 1-n may be linked in a 10BASE-T standard star-type network structure through the LAN cable 11.

The host computer 3 and terminal units 1-1 through 1-n start operating at the time of power-on to load the multi-tasking and multi-user operating systems from their ROMs and run the systems.

The host computer 3 transfers control programs for the bi-directional control of AV appliances to the terminal units 1-1 through 1-n over the LAN cable 11 at a prescribed time of day (e.g., at night when the bi-directional control system does not run). When the bi-directional control system is running, the host computer 3 can control the terminal units 1-1 through 1-n to limit their operable AV appliances on a time band basis.

The various AV appliances 2-1 through 2-n installed in the individual rooms are connected through a CATV cable 12, by which they mutually transact their input/output AV signals.

Figure 2:
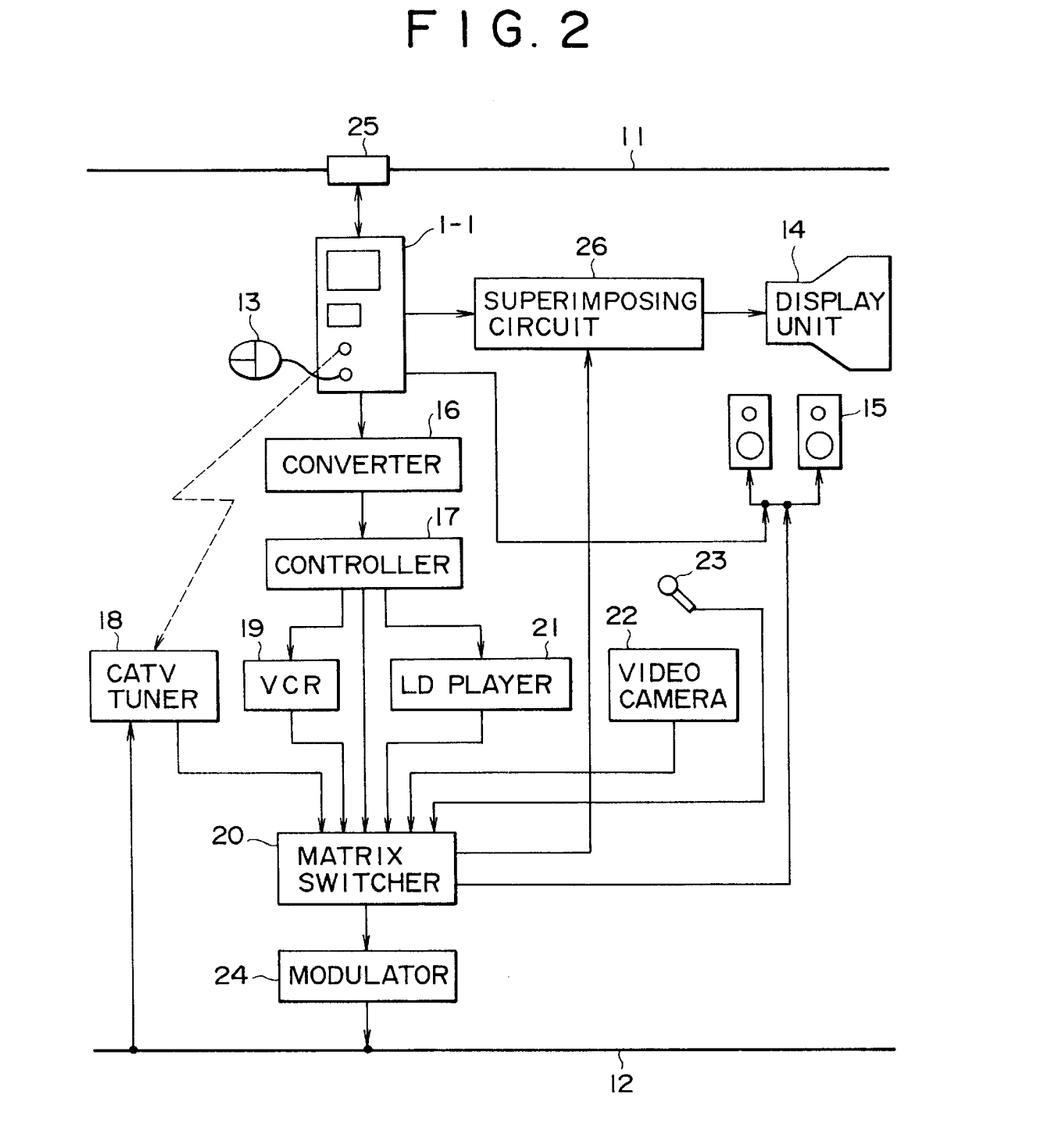
FIG. 2 is a block diagram showing the mutual connection of the terminal unit and AV appliances installed in room A-1 shown in FIG. 1.

FIG. 2 shows an embodiment of the arrangement of the terminal unit 1-1 and its associated various AV appliances installed in the room A-1. The terminal unit 1-1 receives through its connector 25 the control program which is transferred over the LAN cable 11, and runs the program to commence the bi-directional control process.

Once the bi-directional control process has started, the terminal unit 1-1 analyzes the instruction signal that is entered by the user with a mouse 13, produces a control signal for a relevant AV appliance, and sends the signal to the converter 16. The terminal unit 1-1 also responds to an incoming request signal received through the LAN cable 11 and connector 25 to produce and send a control signal for a specified AV appliance to the converter 16.

In response to the user's instruction signal that specifies the output of an AV appliance in other room, the terminal unit 1-1 produces a request signal for that AV appliance and transmits the signal to the terminal unit of the other room through the connector 25 over the LAN cable 11.

The terminal unit 1-1 further produces a video signal for displaying a menu that prompts the user to select one of output AV signals of the AV appliances within the bi-directional control system, and sends the video signal to a superimposing circuit 26.

The converter 16 converts the control signal of RS-232C interface provided by the terminal unit 1-1 into an RS-422 serial interface signal, and sends it to the controller 17. The controller 17 distributes the control signal from the converter 16 to AV appliances such as a VCR (Video Cassette Recorder) 19, LD (Laser Disc) player 21 and matrix switcher 20.

The CATV tuner 18 demodulates the signal incoming from the modulator of other room over the CATV cable 12 into a video signal and audio signal in response to the control signal of infrared rays emitted by the terminal unit 1-1, and sends the demodulated signals to the matrix switcher 20.

The VCR 19 and LD player 21 operate in accordance with the control signal from the controller 17 to deliver the reproduced signals to the matrix switcher 20. The video camera 22 and microphone 23 produce a video signal and audio signal from the image and sound of an object, and send the signals to the matrix switcher 20.

The matrix switcher 20 operates in accordance with the control signal from the controller 17 to select a specified video signal and audio signal out of the signals provided by the CATV tuner 18, VCR 19, LD player 21, video camera 22 and microphone 23, and sends the selected AV signals to the superimposing circuit 26 and speaker 15. The matrix switcher 20 also sends a video signal and audio signal of a certain AV appliance to the modulator 24 in response to a relevant control signal.

The modulator 24 modulates the video signal and audio signal from the matrix switcher 20, and transmits the modulated AV signals over the CATV cable 12 to the CATV tuner of the specified room. The superimposing circuit 26 superimposes the video signal from the terminal unit 1-1 with the video signal from the matrix switcher 20, and delivers a superimposed video signal to the display unit 14.

The same terminal units and AV appliances as those described above are installed in the remaining rooms.

Figure 3:
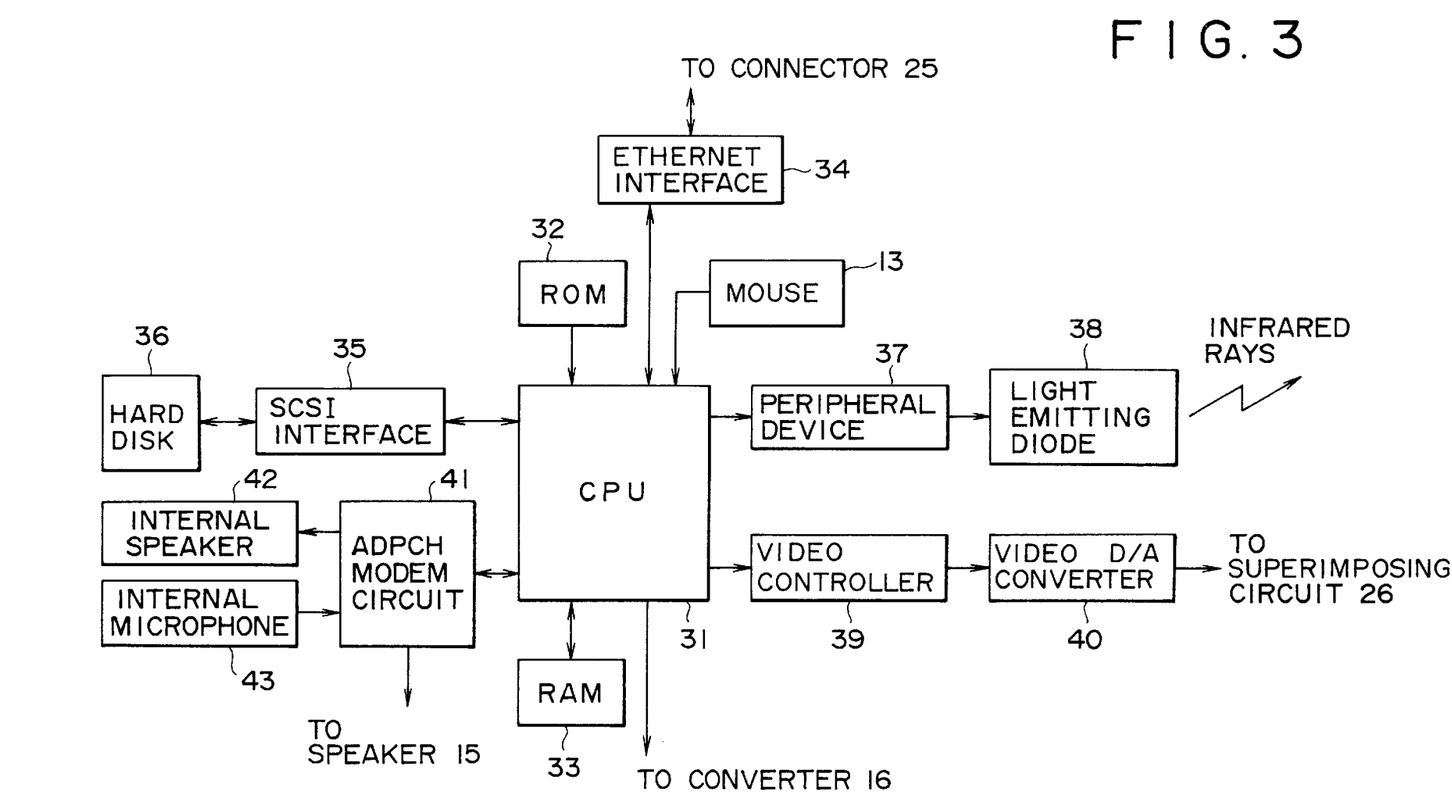
FIG. 3 is a block diagram showing the arrangement of the terminal unit 1-1 shown in FIG. 2 based on an embodiment of this invention.

FIG. 3 shows an embodiment of the arrangement of the terminal unit 1-1 installed in the room A-1.

When the terminal unit 1-1 is turned on, the CPU 31 loads the operating system from the ROM 32 having a 512K-byte capacity. The operating system has the ability of multitasking, which is similar to that of UNIX, for the terminal unit 1-1.

The CPU 31 receives by way of the Ethernet interface 34 the control program which is transferred through the LAN cable 11 and connector 25 to the terminal unit 1-1, system calls generated by tasks of terminal units of other rooms and of the host computer 3, and request signals originating from terminal units of other rooms. The CPU 31 sends out a request signal or system call to be delivered to a terminal unit of other room over the LAN cable 11 by way of the Ethernet interface 34 and connector 25.

The control program transferred to the CPU 31 through the Ethernet interface 34 is stored in the RAM 33, which also stores audio data produced by the internal microphone 43 and ADPCM modem circuit 41 and, in addition, serves as a video RAM. A control instruction signal produced by the user with the mouse 13 is entered directly to the CPU 31.

A hard disk 36 which is an optional facility of the terminal unit is used to store various programs such as utility programs and various data such as bitmap data and sound data. These data are stored or readout of the hard disk 36 through the SCSI interface 35 under control of the CPU 31.

A peripheral device 37 receives from the CPU 31 an instruction signal for controlling a peripheral appliance (the CATV tuner 18 in the example shown in FIG. 2), and activates a light emitting diode 38 to produce a control signal of infrared rays.

The ADPCM modem circuit 41 converts the audio signal from the internal microphone 43 into audio data and sends it to the CPU 31, and converts audio data from the CPU 31 into an audio signal and delivers it to the internal speaker 42 or speaker 15.

Video data (OSD data) transferred by the CPU 31 to a video controller 39 is converted into a video signal by it, further converted into an analog signal by a video D/A converter 40, and sent to the superimposing circuit 26.

In case an instruction signal from the mouse 13 or an external signal from the Ethernet interface 34 specifies the output of an AV appliance in the room A-1, the CPU 31 produces a corresponding control signal and sends it to the converter 16.

The terminal units of other rooms has the same arrangement as explained above.

Figure 4:
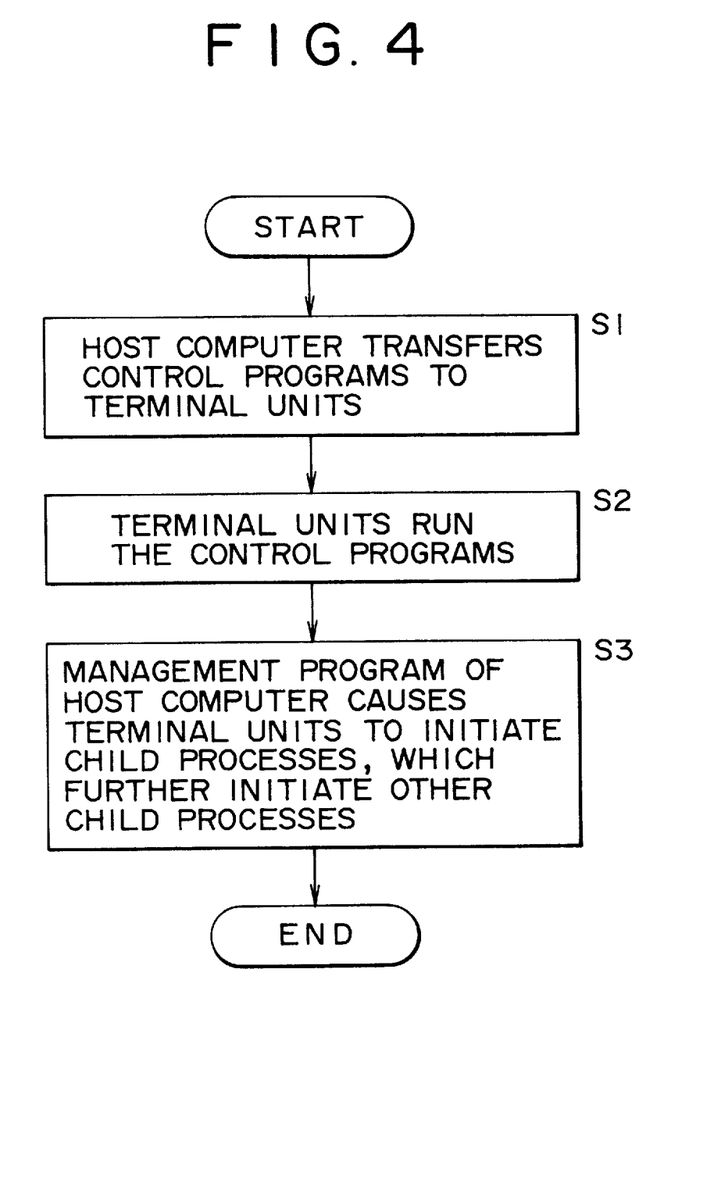
FIG. 4 is a flowchart explaining the operation of the bi-directional control system shown in FIG. 1.

Next, the operations of the host computer 3 and terminal units 1-1 through 1-*n* for running the bi-directional control system will be explained with reference to the flowchart of FIG. 4.

The system operation starts when the host computer 3 and terminal units 1-1 through 1-*n* in individual rooms are turned on.

In step S1, the host computer 3 runs a management program for the bi-directional control system to initiate management processes (tasks). These management processes transfer control programs from the host computer 3 to the terminal units 1-1 through 1-*n* over the LAN cable 11 at a prescribed time of day (e.g., at night when the terminal units are not used by users).

In step S2, the terminal units 1-1 through 1-*n* run the control programs received, and enter the state of waiting for system calls from the respective management processes of the host computer 3. The terminal units are now ready to initiate processes that depends on system calls issued by the respective management processes.

In step S3, the management process for each terminal unit causes the terminal unit to initiate a child process, which may further initiate another child process, thereby to carry out the control specific to the terminal unit.

Figure 5:
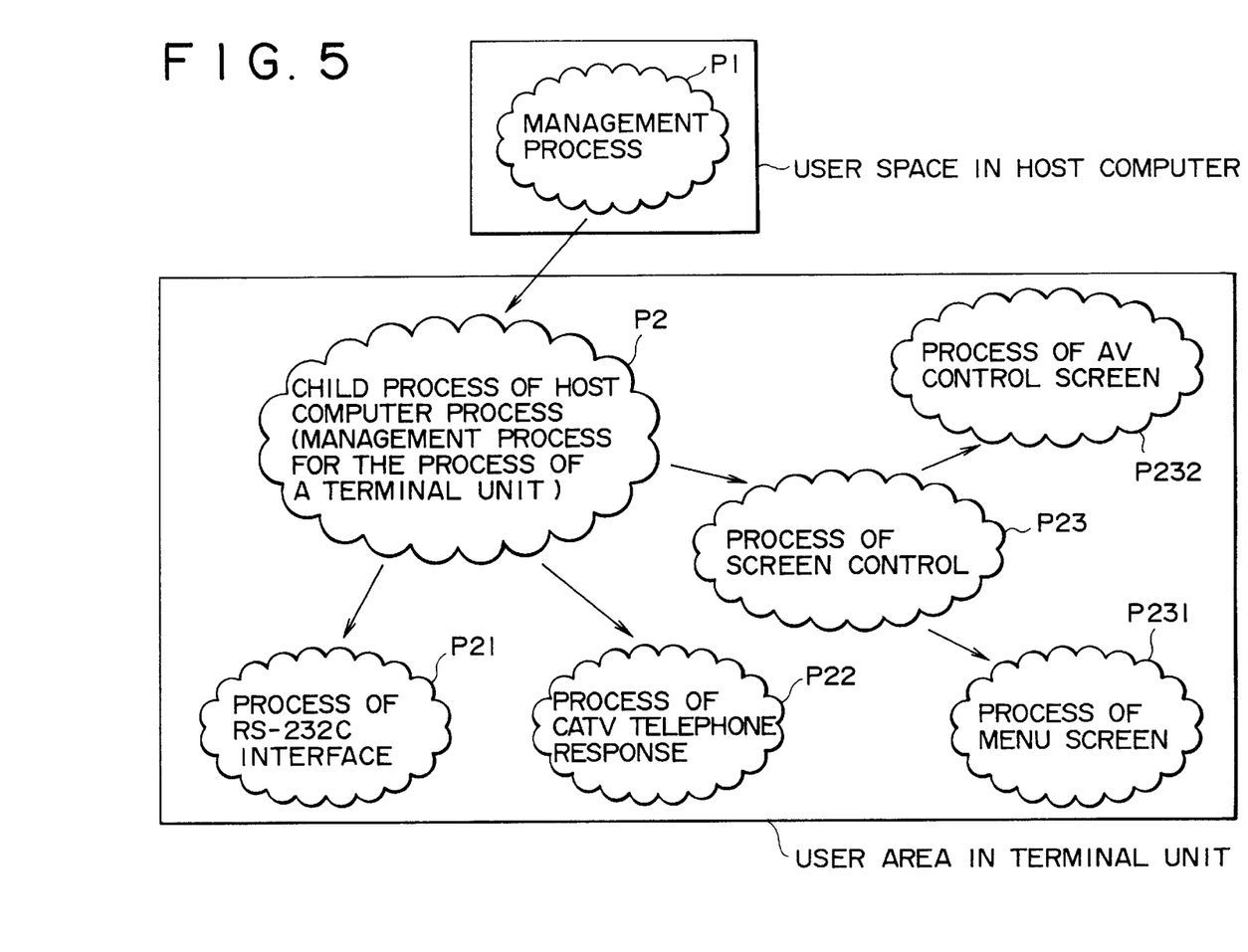
FIG. 5 is a diagram used to explain the operation of step S3 of the flowchart of FIG. 4.

The operation of the step S3 will be explained in more detail with reference to FIG. 5.

A management process P1 which is run in a user space of the host computer 3 issues a system call for process initiation to the operating system of a terminal unit in compliance with the control specifications of AV appliances of the terminal unit. The operating system of the terminal unit initiates in its user space a process P2 that is a child process of the management process P1 and functions to control the operations of the AV appliances.

The process P2 issues system calls to the operating system thereby to initiate processes for controlling AV appliances. For example, the process P2 initiates a process P21 for controlling the RS-232C input/output, a process P22 for controlling the CATV telephone response, and a process 23 for controlling the displayed screen.

A process initiated in the user space of terminal unit may initiate its child process. For example, the display control process P23 initiates a process P231 for controlling the menu screen and a process P232 for controlling the AV control screen. These processes of terminal unit run in parallel under control of the multi-task operating system.

Consequently, AV appliance control that is unique to each room can be accomplished. By making the management process to operate on the terminal units to initiate child processes at a prescribed time of day, it is possible to alter the control of AV appliances by time, thereby limiting the availability of AV appliances on a time band basis.

Figure 6:
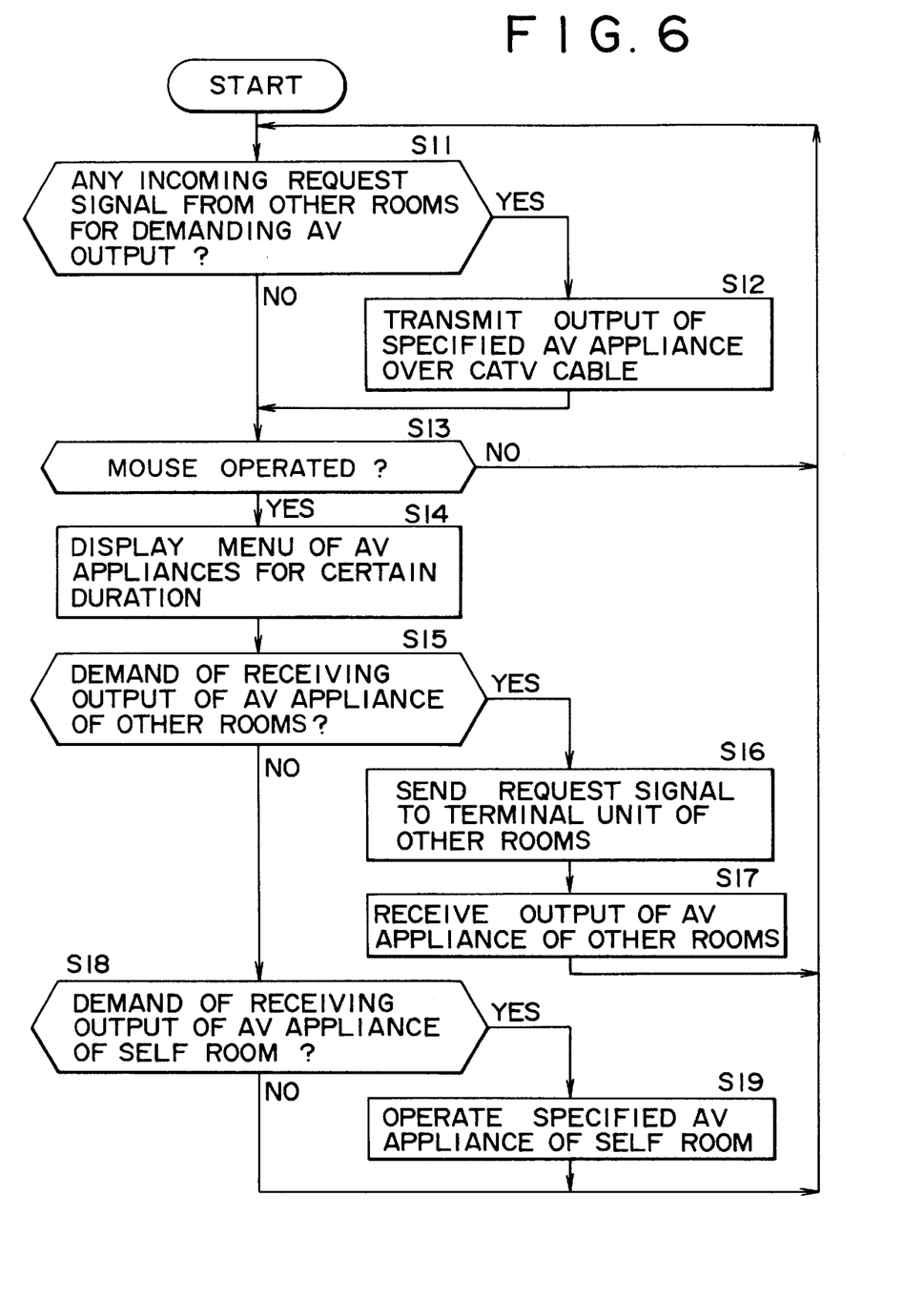
FIG. 6 is a flowchart explaining the operation of the terminal unit 1-1 shown in FIG. 1.

Next, the operation of the terminal unit 1-1 shown in FIG. 2 will be explained more specifically with reference to FIG. 6. It is assumed that the bi-directional control system is already running based on the operations shown in FIG. 4.

In step S11, the CPU 31 tests as to whether there is an incoming request signal through the Ethernet interface 34 from any of other terminal units 1-2 through 1-*n*.

If the CPU 31 detects in step S12 an incoming request signal from other terminal unit, it produces a control signal for operating on the matrix switcher 20 to select the output of the AV appliance specified by the request signal, and sends the control signal to the converter 16. The control signal is converted into the RS-422 format signal by the converter 16 and sent by way of the controller 17 to the specified AV appliance and the matrix switcher 20.

The AV appliance sends its output AV signal to the matrix switcher 20, which then sends the AV signal to the modulator 24. The modulator 24 modulates the AV signal and transmits the modulated AV signal over the CATV cable 12 to the CATV tuner of the terminal unit that has issued the request signal. Consequently, the AV signal of the AV appliance of the terminal unit 1-1 specified by the request signal is delivered to the CATV tuner of the demanding terminal unit of the other room.

In the subsequent step S13, the CPU 31 tests as to whether the mouse 13 produces a signal by being operated by the user in the room A-1. In the case of the absence of signal from the mouse 13, the operation sequence returns to the step S11.

Accordingly, unless the user of the room A-1 operates the mouse 13, the terminal unit 1-1 implements only the operation of transmitting an AV signal to a demanding terminal unit of other room.

Next, it is assumed that the user in the room A-1 operates the mouse 13. The CPU 31 which monitors the signal of the mouse 13 detects its operation in step S13, and produces image data for displaying a menu screen of AV appliances and sends the data to the superimposing circuit 26 by way of the video controller 39 and video D/A converter 40. The superimposing circuit 26 superimposes the image data with the video signal from the AV appliance provided by the matrix switcher 20, and delivers the superimposed video signal to the display unit 14. At the beginning, the matrix switcher 20 provides no video signal of AV appliance for the superimposing circuit 26, and only the menu screen is displayed on the display unit 14. The menu screen of AV appliances on the display unit 14 is erased if the user does not operate the mouse 13 for a certain time length.

In the subsequent step S15, the CPU 31 tests as to whether the user demands the reception of the output of an AV appliance installed in other room. On detecting the user's demand of the AV output of other room, the CPU 31 prompts the user in step S16 to select an AV appliance of other room on the menu screen. The CPU 31 receives an instruction signal generated by the user's operation, produces a request signal of the output of the specified AV appliance, and transmits the request signal over the LAN cable 11 by way of the Ethernet interface 34 and connector 25 so that the signal is delivered to the terminal unit of the room where the specified AV appliance is installed.

In the subsequent step S17, the CPU 31 operates on the peripheral device 37 to produce a control signal for causing the CATV tuner 18 to receive the AV signal of the specified AV appliance of the other room. The peripheral device 37 converts the control signal into a signal of infrared rays by means of the light emitting diode 38, and emits the signal.

On receiving the signal of infrared rays, the CATV tuner 18 extracts the specified AV signal from among signals on the CATV cable 12, demodulates the AV signal, and sends the demodulated AV signal to the matrix switcher 20. The CPU 31 produces a control signal for delivering the AV signal from the CATV tuner 18 to the speaker 15 and superimposing circuit 26, and sends the control signal to the matrix switcher 20 by way of the converter 16 and controller 17. In response to the control signal, the matrix switcher 20 delivers the AV signal from the CATV tuner 18 to the speaker 15 and superimposing circuit 26.

Consequently, the user in the room A-1 can watch and hear the output of the AV appliance installed on the other room by operating the terminal unit of one's own room A-1.

Next, if the user who has been watching and hearing the output of the AV appliance of other room operates the mouse 13 with the intention of choosing the output of an AV appliance in one's own room A-1, the foregoing steps S11 through S14 take place, with the display unit 14 displaying the menu screen of AV appliances superimposed on the picture from the AV appliance of the other room.

In step S18, the CPU 31 tests as to whether the output of an AV appliance in the room A-1 is demanded. On detecting the demand of AV output of room A-1, the CPU 31 at step S18 operates on the display unit 14 to display the menu screen of AV appliances, prompting the user to select an AV appliance in the room A-1. The CPU 31 receives an instruction signal of user's selection, produces a control signal for controlling the output of the specified AV appliance, and sends the control signal to the controller 17 by way of the converter 16.

The controller 17 sends the control signal to the specified AV appliance and matrix switcher 20. The AV appliance responds to the control signal to send the output AV signal to the matrix switcher 20. The matrix switcher 20 sends the output AV signal from the AV appliance to the speaker 15 and superimposing circuit 26.

Consequently, the user in room A-1 can cancel the reception of the output of AV appliance of other room and switch to watching and hearing of the output of the AV appliance in one's own room A-1.

In this manner, users in individual rooms can control AV appliances of all rooms to watch and hear the outputs of these AV appliances by operating the terminal units in their own rooms.

It is also possible for the user in each room to transfer the output of an AV appliance of one room to other room by operating the terminal unit in one's own room. Namely, users of individual rooms can control appliances on the computer network arbitrarily through the operation of terminal units in their own rooms. The range of user's control of appliances can be set and altered arbitrarily in the management program of the host computer 3.

Since the management program merely needs to be stored in the host computer 3, it can readily deal with changes in the configuration of AV appliances in individual rooms and the number of rooms where AV appliances are installed, enabling easy system maintenance.

Furthermore, the terminal unit installed in each room may be arranged alternatively to exclude the SCSI interface 35, hard disk 36, ADPCM modem circuit 41, internal speaker 42 and internal microphone 43 shown in FIG. 3, and in this case a low-cost bi-directional control system based on inexpensive terminal units can be realized.

Although in the foregoing embodiment, the control programs stored in the host computer 3 are distributed to individual terminal units over the LAN cable 11, an alternative system configuration is to designate one of terminal units to function as the server that stores control programs and distributes the control programs to the remaining terminal units.

What is claimed is:

1. An audio visual control system, comprising:
   an audio visual network;
   a plurality of audio visual appliances coupled with said audio visual network;
   a computer network;
   a plurality of controllers coupled with said computer network, each of said controllers associated with at least one of said plurality of audio visual appliances, each of said controllers comprising:
      means for transmitting a control request through said computer network, said control request requesting audio visual information from one of said plurality of audio visual appliances associated with another of said plurality of controllers;
      means for receiving a control request that is transmitted through said computer network and;
      means for controlling said associated audio visual appliance in accordance with said control request;
   each of said audio visual appliances comprising:
      means for controlling said audio visual appliance in accordance with a control request received by said associated controller so that said audio visual appliance transmits an audio visual signal to said audio visual network; and
      means for receiving an audio visual signal from said audio visual network in response to a control request transmitted by said associated controller.

2. The control system of claim 1, wherein said audio visual network comprises a community antenna television network (CATV) and said computer network comprises a local area network (LAN).

3. A method for controlling an audio visual control system, comprising the steps of:
   providing an audio visual network;
   coupling a plurality of audio visual devices with said audio visual network;
   providing a computer network;
   coupling a plurality of controllers with said computer network, each of said controllers associated with at least one of said plurality of audio visual devices;
   transmitting a control request through said computer network, said control request requesting audio visual information from one of said plurality of audio visual appliances associated with another of said plurality of controllers;
   receiving a control request that is transmitted through said computer network;
   controlling said audio visual appliance in accordance with a control request received by said associated controller so that said audio visual appliance transmits an audio visual signal to said audio visual network; and
   receiving an audio visual signal from said audio visual network in response to a control request transmitted by said associated controller.

4. The audio visual control system of claim 1, wherein at least one of said plurality of audio visual appliances is a video tape recorder.

5. The audio visual control system of claim 1, wherein at least one of said plurality of audio visual appliances is a digital versatile disc (DVD) player.

6. The audio visual control system of claim 1, wherein each of said plurality of audio visual appliances and associated controller is located in a different location.

7. The audio visual control system of claim 1, wherein each control request includes at least a destination audio visual appliance code indicating which of said plurality of audio visual appliances said control request is addressed.

8. The audio visual control system of claim 7, wherein each of said plurality of associated controllers determines if said destination audio visual appliance code from each control request is addressed to its associated audio visual appliance.

9. The audio visual control system of claim 8, wherein when said controller determines that said destination audio visual appliance code from said control request indicates that said control request is addressed to said associated audio visual appliance, said controller controls said associated audio visual appliance in accordance with said control request.

10. The method of claim 3, wherein at least one of said plurality of audio visual appliances is a video tape recorder.

11. The method of claim 3, wherein at least one of said plurality of audio visual appliances is a digital versatile disc (DVD) player.

12. The method of claim 3, further comprising the step of locating each of said plurality of audio visual appliances and associated controller in a different location.

13. The method of claim 3, further comprising the step of including at least a destination audio visual appliance code within each said control request indicating to which of said plurality of audio visual appliances said control request is addressed.

14. The method of claim 13, further comprising the step of determining if said destination audio visual appliance code from each control request is addressed to the associated audio visual appliance of a particular controller.

15. The method of claim 14, further comprising the step of controlling said associated audio visual appliance in accordance with said control request when said controller determines that said destination audio visual appliance code from said control request indicates that said control request is addressed to said associated audio visual appliance.

* * * * *